US008802369B2

(12) United States Patent
Nagahama et al.

(10) Patent No.: US 8,802,369 B2

(45) Date of Patent: Aug. 12, 2014

(54) GEL HAVING BIOSUBSTANCE FIXED THERETO AND MICROARRAY UTILIZING THE GEL

(75) Inventors: Chiaki Nagahama, Kanagawa (JP); Chiho Itou, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/098,613

(22) Filed: May 2, 2011

(65) Prior Publication Data

US 2012/0010088 A1 Jan. 12, 2012

Related U.S. Application Data

(62) Division of application No. 12/014,251, filed on Jan. 15, 2008, now abandoned, which is a division of application No. 10/508,946, filed as application No. PCT/JP03/04274 on Apr. 3, 2003, now abandoned.

(30) Foreign Application Priority Data

Apr. 3, 2002 (JP) ................................ 2002-101675

(51) Int. Cl.

*C12Q 1/68* (2006.01)
*C12P 19/34* (2006.01)

(52) U.S. Cl.

USPC .......................................... 435/6.1; 435/91.2

(58) Field of Classification Search

USPC ................................................. 435/6.1, 91.2

See application file for complete search history.

(56) References Cited

U.S. PATENT DOCUMENTS

| | | | |
|---|---|---|---|
| 4,414,374 | A | 11/1983 | Gunesin et al. |
| 5,401,508 | A | 3/1995 | Manesis |
| 6,506,594 | B1 | 1/2003 | Barany et al. |
| 2003/0049435 | A1 | 3/2003 | Haddad et al. |
| 2004/0137453 | A1 | 7/2004 | Uragaki et al. |
| 2004/0258897 | A1 | 12/2004 | Otsuki et al. |

FOREIGN PATENT DOCUMENTS

| | | |
|---|---|---|
| CA | 2 445 758 | 11/2002 |
| EP | 1158047 | 11/2001 |
| JP | 63-503150 | 11/1988 |
| JP | 11-513740 | 11/1999 |
| JP | 2000-270879 | 10/2000 |
| JP | 2001-248072 | 9/2001 |
| JP | 2002-500374 | 1/2002 |
| JP | 2003-83967 | 3/2003 |
| WO | 99/19711 | 4/1999 |
| WO | 01/36958 | 5/2001 |
| WO | 02/062817 | 8/2002 |
| WO | 03/012423 | 2/2003 |

OTHER PUBLICATIONS

Canadian Office Action issued Dec. 7, 2011, in Patent Application No. 2,481,323.

Dmitri Proudnikov, et al., "Immobilization of DNA in Polyacrylamide Gel for the Manufacture of DNA and DNAa-Oligonucleotide Microchips", Analytical Biochemistry, Academic Press, XP-002928888, vol. 259, 1998, pp. 34-41.

Timofeev et al., Nucleic acids research, vol. 24, No. 16, pp. 3142-3148, 1996.

*Primary Examiner* — Cynthia B Wilder

(74) *Attorney, Agent, or Firm* — Oblon, Spivak, McClelland, Maier & Neustadt, L.L.P.

(57) ABSTRACT

The present invention provides a biological substance-immobilized gel which comprises a gel containing 2%-7% by mass of N,N-dimethylacrylamide and a biological substance immobilized on and/or in the gel.

10 Claims, 1 Drawing Sheet

Fig. 1
| | Example 1 | Comparative Example 1 | Comparative Example 2 |
|---|---|---|---|
| Spot intensity | 5240963 | 1525464 | 1505942 |
| Spot image | | | |
| Gel prepared from polymerization solution 1 | | | |
| Gel prepared from polymerization solution 2 | | | |
Fig. 2
| | Example 2 | Example 3 | Comparative Example 3 | Comparative Example 4 |
|---|---|---|---|---|
| Spot intensity | 20831 | 15595 | 11272 | — |
| Spot image | | | | |
| Gel prepared from polymerization solution 1 | | 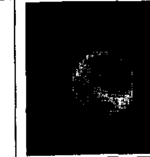 | 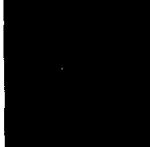 | No gel |
| Gel prepared from polymerization solution 2 | | 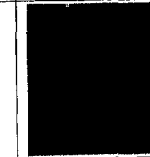 | | No gel |

GEL HAVING BIOSUBSTANCE FIXED THERETO AND MICROARRAY UTILIZING THE GEL

CROSS-REFERENCE TO RELATED APPLICATIONS

This application is a Division of Ser. No. 12/014,251 filed Jan. 15, 2008, Abandoned, which is a Division of Ser. No. 10/508,946 filed Jul. 11, 2005, Abandoned, which is a National Stage of PCT/JP03/04274 filed Apr. 3, 2003.

TECHNICAL FIELD

The present invention relates to a biological substance-immobilized gel and a biological substance-immobilized gel microarray using the same. The microarray is used for analysis of gene expression, etc.

BACKGROUND ART

The decoding of human genome is now progressing and helping clarify causal relations between various diseases or diatheses and specific gene sequences. For example, such a gene analysis is intended to use for predicting the onset of diseases, side effects of drugs, etc.

A means conventionally used for gene analysis is gel-based electrophoresis. In recent years, capillary gel electrophoresis has been developed with the aim of separating and analyzing trace amounts of biological samples in a short time. Capillary gel electrophoresis uses glass capillaries filled with a hydrogel such as acrylamide.

In addition, microarrays carrying multiple capture probes for DNA or protein detection (i.e., probes capable of capturing target DNA or protein molecules and the like through hybridization or binding to the DNA or protein molecules to be detected) are employed as useful tools for detecting mutations and expression levels of many genes all at once. Such microarrays are also known to have a large number of variations which are constructed using a gel. Among them, microarrays known to use a gel for immobilization of capture probes include, for example, those having multiple slots or holes on a substrate (e.g., a resin board), in which the slots or holes are filled with a DNA-containing gel (see JP 2000-60554 A), as well as those having gel spots containing DNA or other substances on a flat substrate (see U.S. Pat. No. 5,770,721). Also, some of the inventors of the present invention have developed a microarray that is obtained by creating a hollow fiber alignment comprising hollow fibers whose hollow space is filled with a capture probe-containing gel and then cutting the alignment in a direction intersecting with its fiber axis. This microarray has been filed for patent application (see JP 2000-270877 A, JP 2000-270878 A and JP 2000-270879 A).

These capture probe-immobilized microarrays may be used for hybridization with an analyte to detect specific nucleotide sequences. Detection of hybrids is accomplished by using a known means capable of specifically recognizing the hybrids, as exemplified by fluorescence detection.

However, there has been a problem that when the microarrays after hybridization are measured for fluorescence intensity in each of their compartments where capture probes are immobilized, the fluorescence intensity is higher in the outer regions of the compartments, but lower in the center regions of the compartments.

DISCLOSURE OF THE INVENTION

The object of the present invention is to obtain gel composition which ensures a uniform distribution of fluorescence intensity in each compartment and provides a higher value for total fluorescence intensity summed over the entire area of each compartment, i.e., higher hybridization efficiency in the detection of a microarray after hybridization.

As a result of extensive and intensive efforts made to overcome the problem stated above, the inventors of the present invention have found that when capture probes are immobilized on and/or in a gel satisfying the following properties, it is possible to ensure a uniform distribution and increased level of fluorescence intensity in each compartment, i.e., higher hybridization efficiency. This finding led to the completion of the present invention.

Namely, the present invention provides a biological substance-immobilized gel which comprises a gel containing 2%-7% by mass of N,N-dimethylacrylamide and a biological substance immobilized on and/or in the gel. The present invention also provides a biological substance-immobilized gel which comprises a gel having the following composition and a biological substance immobilized on and/or in the gel:

| | |
|---|---|
| (a) N,N-dimethylacrylamide | 2% to 7% by mass |
| (b) cross-linking agent | 0.1% to 1.5% by mass. |

In the above biological substance-immobilized gel, examples of a biological substance include nucleic acids. On the other hand, examples of a cross-linking agent include multifunctional monomers having at least two ethylenically unsaturated bonds, as exemplified by methylenebisacrylamide.

The present invention further provides a method for preparing a biological substance-immobilized gel, which comprises immobilizing a biological substance on and/or in a gel containing 2%-7% by mass of N,N-dimethylacrylamide. In the present invention, the gel is preferably obtained by reacting 2%-7% by mass of N,N-dimethylacrylamide in the presence of 0.1%-1.5% by mass of a cross-linking agent.

The present invention further provides a gel-filled hollow tube which comprises a hollow tube whose hollow space is filled with the biological substance-immobilized gel mentioned above. Examples of a hollow tube include hollow fibers.

The present invention further provides a method for manufacturing a biological substance-immobilized gel microarray, which comprises allowing a plurality of the above gel-filled hollow tubes to be tied in a bundle and cutting the tube bundle in a direction intersecting with the longitudinal direction of the tubes.

The present invention further provides a method for manufacturing a biological substance-immobilized gel microarray, which comprises the following steps:

(a) allowing a plurality of hollow tubes to be tied in a bundle;

(b) filling the above biological substance-immobilized gel into the hollow space of each tube in the resulting tube bundle; and (c) cutting the tube bundle in a direction intersecting with the longitudinal direction of the tubes.

The present invention further provides a biological substance-immobilized gel microarray which comprises the above biological substance-immobilized gel arranged in multiple compartments. In this case, the surface area of each compartment is preferably $10^{-6}$ $m^2$ or less. It is also possible to employ a biological substance-immobilized gel microarray whose compartments are formed by slots or through holes.

The present invention further provides a biological substance-immobilized gel microarray which is obtained by allowing a plurality of the above gel-filled hollow tubes (e.g., hollow fibers) to be tied in a bundle and cutting the tube bundle in a direction intersecting with the longitudinal direction of the tubes.

The present invention further provides a method for detecting a target to be measured (e.g., nucleic acids such as DNA), which comprises reacting an analyte with the microarray mentioned above and detecting the target in the analyte. In a case where a target to be measured in this detection is DNA, it is preferably 100 nucleotides or less in length.

The present invention will be described in more detail below.

The present invention is directed to a gel comprising a biological substance immobilized thereon and/or therein (i.e., a biological substance-immobilized gel), whose composition includes N,N-dimethylacrylamide (2% to 7% by mass).

As used herein, the term "biological substance" is intended to mean a biological material which may be used as a capture probe. Examples include deoxyribonucleic acids (DNA), ribonucleic acids (RNA), proteins and lipids. These biological substances may be commercially available or derived from living cells, etc.

For example, DNA extraction from living cells may be accomplished, e.g., by the method or Blin et al. [Nucleic. Acids. Res. 3, 2303 (1976)], while RNA extraction may be accomplished, e.g., by the method of Favaloro et al. [Methods. Enzymol. 65. 718 (1980)]

DNA used for this purpose is linear or circular plasmid DNA or chromosomal DNA. It is also possible to use DNA fragments cleaved with restriction enzymes or by chemical treatments, DNA molecules synthesized in vitro by enzymatic or other processes, or oligonucleotides chemically synthesized, etc.

Biological substances prepared by the methods stated above or other techniques are immobilized on and/or in a gelatinous material (hereinafter referred to as a gel). As used herein, the term "immobilized" is used to mean that a biological substance is retained on and/or in a gel.

The composition of such a gel includes N,N-dimethylacrylamide in an amount of 2% to 7% by mass of the gel, but the following composition is preferred:

| | |
|---|---|
| (a) N,N-dimethylacrylamide | 2% to 7% by mass |
| (b) cross-linking agent | 0.1% to 1.5% by mass. |

More preferably, the lower limit of the amount of N,N-dimethylacrylamide is 2.5% to 5.0% by mass.

Preferred cross-linking agents are multifunctional monomers having at least two ethylenically unsaturated bonds. The amount of such a cross-linking agent is preferably 0.1% to 1.5% by mass of the gel, and more preferably 0.3% to 0.7% by mass of the gel. Any cross-linking agent can be used without particular limitations as long as it is among the multifunctional monomers stated above. Examples include methylenebisacrylamide, divinylbenzene, and polyethylene glycol di(meth)acrylate.

To prepare such a gel, for example, N,N-dimethylacrylamide and a cross-linking agent may be mixed and copolymerized in an aqueous medium, or alternatively, N,N-dimethylacrylamide may be polymerized to give a prepolymer, which in turn may be mixed and copolymerized with a cross-linking agent.

To immobilize biological substances on and/or in the above gel, for example, biological substances modified to have a terminal vinyl group may be added during polymerization and copolymerized with components of the gel (see WO 02/62817), or a hydrazine-treated gel may be prepared and reacted with biological substances having an amino group (see JP 6-507486 A).

The biological substance-immobilized gel prepared in the present invention preferably has a water permeability of $1.0\times10^{-5}$ $m^3\cdot m\cdot/m^2/hr/MPa$ or more. The water permeability of the gel is calculated from the amount of water permeating through the gel. A water permeation experiment is performed as follows and the measured value is defined as the water permeability.

A gel disk of 1 mm thickness and 20 mm diameter is prepared and overlaid on a support filter (Millipore SMWPO4700). The gel disk is then placed in a filtration holder (ADVANTEC UHP-43K) and the holder is filled with water. Nitrogen pressure is then applied to the filtration holder and a PE tube of 2 mm diameter is connected to the filtrate outlet. The amount of water permeating through the gel disk is estimated from the time required for the front-end of the filtrate to move a given distance (40 cm) through the tube, followed by calculation of the water permeability.

In addition, the gel preferably has a shape retention rate of 0.4 or more, more preferably 0.6 or more . . . . The shape retention rate of the gel is defined as the value measured as follows.

A gel is prepared in a cylindrical container of 13 mm diameter and 4 cm length. The gel is removed from the container, allowed to stand at 25° C. for 24 hours in an airtight container, and then measured for its height. The shape retention rate is then calculated by the following equation:

Shape retention rate=height(mm) of the gel after 24 hours/13 mm(initial diameter of the gel)

The thus prepared biological substance-immobilized gel may be used as a tool for gene analysis as a gel carrying capture probes.

For example, the above gel may be filled into the hollow space of a hollow tube to prepare a gel-filled hollow tube, which in turn can be used as an analysis tool for genes, etc. It should be noted that the hollow space may be filled with the gel in the same manner as in the production of capillary columns used for capillary gel electrophoresis.

The gel of the present invention may also be used as a component of a microarray. For example, when the above gel carrying capture probes immobilized thereon and/or therein (hereinafter referred to as an immobilized gel) is arranged on a flat substrate, it is possible to manufacture a microarray in which the immobilized gel is arranged in multiple compartments on the flat substrate (see JP 6-507486 A and U.S. Pat. No. 5,770,721). A flat substrate having multiple slots or through holes may also be used for this purpose. In this case, a biological substance-containing monomer solution before or immediately after initiation of polymerization may be introduced into each compartment formed by a slot or a through hole, followed by polymerization and cross-linking within each compartment to give a microarray in which a biological substance-immobilized gel is arranged on the substrate (i.e., a biological substance-immobilized gel microarray) (see JP 2000-60554 A).

The type of biological substance to be retained in each compartment may vary from compartment to compartment. Alternatively, multiple immobilized gels of the same type may be grouped together and arranged on a microarray. Likewise, a gel carrying, e.g., a pigment instead of a biological substance may be retained in a compartment(s) to determine the coordinates of compartments.

The surface area of each compartment is usually $10^{-6}$ $m^2$ or less. The lower limit is not restricted in any way as long as biological substances can be detected.

In the present invention, examples of hollow tubes include glass tubes, stainless steel tubes, and hollow fibers. In terms of processability and ease of handling, hollow fibers are preferred for use. Examples of fibers available for use in the present invention include chemical fibers such as synthetic fibers, semi-synthetic fibers, regenerated fibers and inorganic fibers, as well as natural fibers (JP 2000-270878 A). Representative examples of synthetic fibers include various types of polyamide-type fibers such as Nylon 6, Nylon 66 and aromatic polyimide fibers, various types of polyester-type fibers such as polyethylene terephthalate, polybutyrene terephthalate, polylactic acid and polyglycolic acid fibers, various types of acrylic-type fibers such as polyacrylonitrile fibers, various types of polyolefin-type fibers such as polyethylene and polypropylene fibers, various types of polyvinyl alcohol-type fibers, various types of polyvinylidene chloride-type fibers, polyvinyl chloride-type fibers, various types of polyurethane-type fibers, phenol-type fibers, fluoro-type fibers such as polyvinylidene fluoride and poly(tetrafluoroethylene), polyalkylene parahydroxybenzoate-type fibers, as well as fibers formed using (meth)acrylic-type resins such as polymethylmethacrylate.

Representative examples of semi-synthetic fibers include various types of cellulose-type derivative-type fibers originated from diacetate, triacetate, chitin, chitosan and the like, as well as various types of protein-type fibers called promix. Representative examples of regenerated fibers include various types of regenerated cellulose fibers (e.g., rayon, cupra, polynosic) which are obtained by viscose or cuprammonium process or by organic solvent process.

Representative examples of inorganic fibers include glass fibers and carbon fibers. Representative examples of natural fibers include vegetable fibers such as cotton, linen, ramie and jute, animal fibers such as sheep wool and silk, as well as mineral fibers such as asbestos.

Hollow fibers other than natural fibers may be produced in a known manner using special nozzles. The melt spinning technique is preferred for polyamides, polyesters, polyolefins and the like, which can use a horseshoe- or C-shaped nozzle, a double-tubed nozzle, etc.

The solvent spinning technique is preferred for spinning synthetic polymers that are not melt-spinnable and polymers that are used in semi-synthetic fibers or regenerated fibers. As in the case of melt spinning, a double-tubed nozzle is also used in this case to give hollow fibers having a continuous hollow space by spinning the fibers while filling an appropriate liquid as a core material into the hollow space.

The hollow tubes thus prepared may each be used as a base unit for supporting the biological substance-immobilized gel of the present invention. In the case of using hollow tubes, microarrays (biological substance-immobilized gel microarrays) may be manufactured, for example, by allowing a plurality of the above hollow tubes to be tied in a bundle, filling the biological substance-immobilized gel into the hollow space of each hollow tube in the resulting tube bundle, and then cutting the tube bundle in a direction intersecting with the longitudinal direction of the tubes in such a manner as to give cross-sectional slices (see WO 00/53736). In the present invention, individual hollow tubes may be filled with the gel before being tied in a bundle.

In this case, these hollow tubes may be regularly arranged and bonded with an adhesive or the like to give, e.g., a tube alignment in which the hollow tubes are regularly arranged in both vertical and horizontal directions. The term "regularly" is used to mean that tubes are arranged in an orderly manner such that the number of hollow tubes contained in a frame of certain size can be the same.

Such a tube alignment may be produced as follows, by way of example. Namely, two perforated plates with a regular arrangement of holes are provided, and hollow tubes are threaded through the holes in both plates such that the positions of holes in both perforated plates are matched with each other. The space between these perforated plates is then adjusted. It should be noted that the step of threading hollow tubes through the holes and the step of adjusting the space between perforated plates may be conducted in reverse order. Then, tension is applied to the hollow tubes and, under this condition, spaces between the hollow tubes (spaces within the tube bundle) are filled with a resin so as to bond the bundle of the tubes, thereby obtaining a tube alignment (JP 2001-239594 A).

The tube alignment may be of any shape in cross section. For example, hollow tubes may be regularly arranged to form a square or rectangular cross section, or alternatively, hollow tubes may be concentrically arranged to form a circular cross section.

In the present invention, the above tube alignment is cut in a direction intersecting with, preferably perpendicular to, the longitudinal direction (i.e., the axial direction of the hollow tubes) to obtain slices. An example of a cutting method involves cutting slices from the tube alignment using a microtome. The thickness of slices can be arbitrarily adjusted, but it usually ranges from 1 to 5,000 μm, preferably 10 to 2,000 μm.

The slices thus prepared may each be used as a microarray for supporting the biological substance-immobilized gel.

Biological substances immobilized on and/or in the gel in the microarray serve as capture probes for nucleic acids or proteins which hybridize or bind to the biological substances (such nucleic acids or proteins being called targets to be measured). Thus, the microarray of the present invention can be used as a kit for detecting a target(s) to be measured (e.g., nucleic acids or proteins).

An analyte containing biological substances to be detected (e.g., nucleic acids such as DNA) is prepared, added to the microarray and then reacted with biological substances immobilized on and/or in the gel of the microarray. For example, DNA targets to be measured are fluorescently labeled and then hybridized with DNA in the microarray. Subsequently, the microarray is washed to remove unreacted DNA, followed by detection of fluorescence intensity. The fluorescence intensity may be detected using any device (e.g., a commercially available DNA detector). According to the present invention, the inventive "biological substance-immobilized gel which comprises a gel containing 2%-7% by mass of N,N-dimethylacrylamide and a biological substance immobilized on and/or in the gel" has good reactivity and ensures uniform fluorescence intensity per compartment of a microarray, thus providing highly sensitive detection results.

BRIEF DESCRIPTION OF DRAWINGS

FIG. 1 presents photographs showing the results of DNA detection using the microarray of the present invention.

FIG. 2 presents photographs showing the results of DNA detection using the microarray of the present invention.

BEST MODE FOR CARRYING OUT THE INVENTION

The present invention will be further described in more detail in the following Examples, which are not intended to limit the scope of the invention.

Example 1

(1) Production of Polymethylmethacrylate (PMMA) Hollow Fibers

An acrylic resin with a mass molecular weight of about 90,000, which was composed of methyl methacrylate (MMA) and methyl acrylate (MA) in a monomer ratio of 82:18, was used as a source material and melt-extruded using an extruder through a spinning nozzle having a circular outlet, thereby obtaining hollow fibers with an outer diameter of 0.3 mm, an inner diameter of 0.2 mm and a length of 600 mm.

(2) Production of a Hollow Fiber Alignment

Two perforated plates of 0.1 mm thickness were placed one upon another, each of which had 9 holes (diameter: 0.32 mm; center-to-center distance: 0.42 mm) arranged in a 3 by 3 array, and 9 hollow fibers prepared above were then threaded through the respective holes in these perforated plates. The space between these two perforated plates was set to 50 mm and the hollow fibers were fixed under tension at two points, 50 mm and 100 mm from one end.

A resin raw material was then poured into the space between these two perforated plates. As a resin, a polyurethane resin adhesive (Nipporan 4276/Coronate 4403, Nippon Polyurethane Industry Co., Ltd.) was used, which was supplemented with carbon black in an amount of 2.5% by mass, based on the total weight of this adhesive. The plates were allowed to stand at room temperature for 1 week to cure the resin. The perforated plates were then removed to give a hollow fiber alignment.

(3) Preparation of an Oligonucleotide Having a Terminal Vinyl Group (Vinyl-Terminated Oligonucleotide)

Oligonucleotide synthesis was carried out using an automated DNA/RNA synthesizer (PE Biosystems Model 394). In the final step of synthesis, an amino group [$NH_2(CH_2)_6$—] was introduced at the 5'-terminus to synthesize oligonucleotide A (SEQ ID NO: 1) shown below. The same procedure was repeated to synthesize oligonucleotide B (SEQ ID NO: 2), except that no amino group was introduced at the 5'-terminus. Amino group introduction at the 5'-terminus was accomplished by using AminoLink II™ (Applied Biosystem).

These oligonucleotides were deprotected and purified in a standard manner before use.

```
[Oligonucleotide A (SEQ ID NO: 1)]
caaccaacca caactacata cacatac

[Oligonucleotide B (SEQ ID NO: 2)]
gtcatttaga caactctgca agcgt
```

Subsequently; oligonucleotide A (500 nmol/ml, 5 μl) and glycidyl methacrylate (0.5 μl) were mixed and reacted at 70° C. for 2 hours. After completion of the reaction, water was added to a total volume of 25 μl to give an oligonucleotide (100 nmol/ml) having a terminal methacrylate group (GMA-denatured oligonucleotide A).

(4) PCR Reaction of Vinyl-Terminated Oligonucleotide

*Saccharomyces cerevisiae* JCM7255 was grown in 100 ml YPD medium (20 g/L glucose, 10 g/L yeast extract, 20 g/L polypeptone, pH 6.0) at 30° C. for 1 day, followed by collection of the bacterial cells. The chromosomal DNA was prepared in a routine manner from the collected bacterial cells and used as a PCR template.

The GMA-denatured oligonucleotide A and oligonucleotide B were diluted with sterilized water to 50 μM and 5 μM, respectively. These oligonucleotides were used as primers to perform polymerase chain reaction (hereinafter referred to as PCR) with the template prepared above.

PCR conditions were as described in the specification of Ex-Taq (Takara Shuzo Co., Ltd.) and PCR was performed using a TaKaRa PCR Thermal Cycler PERSONAL. The reaction was repeated for 30 cycles with 100 μl under temperature conditions of 93° C. for 30 seconds, 65° C. for 30 seconds and 72° C. for 2 minutes. A vinyl-terminated nucleic acid (capture probe A; SEQ ID NO: 3) was amplified by PCR.

(5) Preparation of a Monomer Solution and a Polymerization Initiator Solution

Polymerization solutions 1 and 2 having the compositions shown in Table 1 were prepared. Monomer solution A and a polymerization initiator solution were prepared as follows.

[Monomer Solution A]

Dimethylacrylamide (0.45 g) and methylenebisacrylamide (0.05 g) were dissolved in a 50/50 (by mass) mixture of glycerine and pure water to give a total volume of 10 ml.

[Polymerization Initiator Solution]

2,2'-Azobis(2-imidazolin-2-yl)propane)dihydrochloride (1 g) was dissolved in pure water to give a total volume of 10 ml.

TABLE 1

| | Polymerization solution 1 | Polymerization solution 2 |
|---|---|---|
| Monomer solution A | 1000 μl | 1000 μl |
| Polymerization initiator solution | 10 μl | 10 μl |
| Capture probe A (100 nmol/ml) | 5 μl | 0 |

(6) Preparation of Slices

Polymerization solution 1 was filled into the hollow space of three hollow fibers in the center row of the hollow fiber alignment obtained in (2) above, while polymerization solution 2 was filled into the hollow space of the other hollow fibers. Polymerization solutions 1 and 2 were filled. The alignment was transferred to an airtight glass container, inside of which was saturated with water vapor, and then allowed to stand at 55° C. for 1 hour to perform polymerization.

After polymerization, the hollow fiber alignment was repeatedly cut using a microtome in a direction perpendicular to the longitudinal direction of the hollow fibers, thereby obtaining slices of about 500 μm thickness.

(7) Hybridization

A hybridization solution was prepared, which was supplemented with 200 fmol/ml oligonucleotide C (SEQ ID NO: 4) complementary to a part of the nucleotide sequence of capture probe A (nucleotides 241 to 339 of SEQ ID NO: 3).

Oligonucleotide C was synthesized in the same manner as shown in (3) above using an automated DNA synthesizer, and Cy5 was introduced at the 5'-terminus. After completion of the synthesis, the oligonucleotide was deprotected and purified in a standard manner before use.

```
[Oligonucleotide C (SEQ ID NO: 4)]
gccaacaatg gaatgttgat tgggcccaaa ccaccttcct

ttcttgggat attggtccat gccaaaaggg agtattcgga

gtcagtggag gcgaaaaga
```

<Composition of Hybridization Solution>

5×SSC (0.75 mol/L sodium chloride, 0.075 mol/l sodium citrate, pH 7.0)

0.02% SDS (sodium lauryl sulfate)

The slice obtained in (6) and the above hybridization solution (1 ml) were poured into a HybriPack, followed by heat-sealing the top end of the pack. Hybridization was performed at 65° C. for 20 hours.

(8) Washing

The slice was removed from the HybriPack and washed under the conditions shown in Table 2 in the order listed. The volume of a washing solution was 10 ml.

TABLE 2

| Composition of washing solution | | Washing temperature | Washing time |
|---|---|---|---|
| 2 × SSC | 0.2% SDS | 25° C. | 20 minutes |
| 0.2 × SSC | 0.2% SDS | 25° C. | 20 minutes |
| 0.2 × SSC | 0.2% SDS | 55° C. | 20 minutes |
| 0.2 × SSC | 0.2% SDS | 55° C. | 20 minutes |
| 0.2 × SSC | 0.2% SDS | 25° C. | 20 minutes |

(9) Detection

The washed slice was placed on a non-fluorescent slide glass and a few drops of sterilized water were put onto the slice. The slide glass was then covered with a cover glass and mounted on a DNA chip detector (GeneTac V, Genomic Solutions K. K.), followed by detection using a Cy5 laser. The image size was set to 10 μm per pixel.

(10) Fluorescence Intensity Measurement

The sum of fluorescence intensity obtained from 80 pixels around the center of each compartment was calculated as the intensity per compartment. FIG. 1 shows the fluorescence intensity obtained, along with an image of the washed hollow fiber and its surrounding area. The center of each compartment was determined as appropriate. As a result, the distribution of fluorescence intensity in the hybridized compartments was uniform.

Comparative Example 1

The same procedure as used in Example 1 was repeated, except that monomer solution A was replaced by monomer solution B.

[Monomer Solution B]

Acrylamide (0.475 g) and methylenebisacrylamide (0.025 g) were dissolved in a 50/50 (by mass) mixture of glycerine and pure water to give a total volume of 10 ml.

FIG. 1 shows the fluorescence intensity obtained, along with an image of the washed hollow fiber and its surrounding area.

The distribution of fluorescence intensity in the hybridized hollow space was uniform, but the fluorescence intensity decreased as compared to Example 1.

Comparative Example 2

The same procedure as used in Example 1 was repeated, except that monomer solution A was replaced by monomer solution C.

[Monomer Solution C]

Acrylamide (0.76 g) and methylenebisacrylamide (0.04 g) were dissolved in a 50/50 (by mass) mixture of glycerine and pure water to give a total volume of 10 ml. FIG. 1 shows the fluorescence intensity obtained, along with an image of the washed hollow fiber and its surrounding area.

The fluorescence intensity was lower than in Example 1, and the fluorescence intensity in the hollow space was high in the peripheral region, but low in the center region.

Example 2

The same procedure as used in Example 1 was repeated to prepare slices, except that monomer solution 4 and capture probe A were replaced by monomer solution D and capture probe B (SEQ ID NO: 5), respectively. Capture probe B was constructed to have a terminal methacrylate group by introducing an amino group at the 5'-terminus and then reacting the same with glycidyl methacrylate.

[Monomer Solution D]

Dimethylacrylamide (0.27 g) and methylenebisacrylamide (0.03 g) were dissolved in a 50/50 (by mass) mixture of glycerine and pure water to give a total volume of 10 ml.

```
[Capture probe B (SEQ ID NO: 5)]
aaatacgcct gcaggcggag atcttccagg cccgcctcaa

gggctggttc gagccaatag tggaagacat
```

Hybridization and washing were performed as follows.

(1) Hybridization

A hybridization solution was prepared, which was supplemented with 1 pmol/ml oligonucleotide E (SEQ ID NO: 6) including, as a part thereof, a complementary sequence to the nucleotide sequence of capture probe B (nucleotides 16 to 85 of SEQ ID NO: 6).

Oligonucleotide E was synthesized using an automated DNA synthesizer, and Cy5 was introduced at the 5'-terminus. After completion of the synthesis, the oligonucleotide was deprotected and purified in a standard manner before use.

```
[Oligonucleotide E (SEQ ID NO: 6)]
gcccactggc gatgcatgtc ttccactatt ggctcgaacc

agcccttgag gcgggcctgg aagatctccg cctgcaggcg

tatttgctgg gtctgttcc
```

[Composition of Hybridization Solution]

6×SSC (0.75 mol/L sodium chloride, 0.075 mol/l sodium citrate, pH 7.0)

0.02% SDS (sodium lauryl sulfate)

The resulting slice and the above hybridization solution (1 ml) were poured into a HybriPack, followed by heat-sealing the top end of the pack. Hybridization was performed at 37° C. for 16 hours.

(2) Washing

The slice was removed from the HybriPack and washed under the conditions shown in Table 3 in the order listed. The washing temperature was 45° C. The volume of a washing solution was 10 ml.

TABLE 3

| | | |
|---|---|---|
| 0.2 × SSC | 0.1% SDS | 20 minutes |
| 0.2 × SSC | 0.1% SDS | 20 minutes |
| 0.2 × SSC | | 20 minutes |

(3) Detection

The washed slice was placed on a non-fluorescent slide glass and a few drops of sterilized water were put onto the slice. The slide glass was then covered with a cover glass and mounted on a DNA chip detector (GeneTac IV, Genomic Solutions K. K.), followed by detection using a Cy5 laser. The image size was set to 10 μm per pixel.

(4) Fluorescence Intensity Measurement

The fluorescence intensity averaged over 200 pixels around the center of each compartment was calculated as the intensity per compartment.

FIG. 2 shows the fluorescence intensity obtained, along with an image of the washed hollow fiber and its surrounding area. The center of each compartment was determined as appropriate. As a result, the distribution of fluorescence intensity in the hybridized compartments was uniform.

Example 3

The same procedure as used in Example 2 was repeated, except that monomer solution D was replaced by monomer solution A. FIG. 2 shows the fluorescence intensity per compartment, along with an image of the washed hollow fiber and its surrounding area. The center of each compartment was determined as appropriate. As a result, the distribution of fluorescence intensity in the hybridized compartments was uniform.

Comparative Example 3

The same procedure as used in Example 2 was repeated, except that monomer solution A was replaced by monomer solution E.

[Monomer Solution E]

N,N-Dimethylacrylamide (0.72 g) and methylenebisacrylamide (0.08 g) were dissolved in a 50/50 (by mass) mixture of glycerine and pure water to give a total volume of 10 ml.

FIG. 2 shows the fluorescence intensity obtained, along with an image of the washed hollow fiber and its surrounding area. The fluorescence intensity was lower than in Example 2, and the fluorescence intensity in the hollow space was high in the peripheral region, but low in the center region.

Comparative Example 4

The same procedure as used in Example 2 was repeated, except that monomer solution A was replaced by monomer solution F.

[Monomer Solution F]

N,N-Dimethylacrylamide (0.18 g) and methylenebisacrylamide (0.02 g) were dissolved in a 50/50 (by mass) mixture of glycerine and pure water to give a total volume of 10 ml.

The sliced chip did not hold any gel and its hollow spaces were not filled (FIG. 2).

INDUSTRIAL APPLICABILITY

The present invention provides a biological substance-immobilized gel. The gel of the present invention is useful for detection of genes such as DNA because its use ensures uniform fluorescence intensity throughout the compartment and achieves higher hybridization efficiency.

SEQUENCE LISTING FREE TEXT

SEQ ID NO: 1: synthetic DNA
SEQ ID NO: 2: synthetic DNA
SEQ ID NO: 3: synthetic DNA
SEQ ID NO: 4: synthetic DNA
SEQ ID NO: 5: synthetic DNA
SEQ ID NO: 6: synthetic DNA

The invention claimed is:

1. A method for detecting a target to be measured, which comprises reacting an analyte with a biological substance-immobilized gel microarray which comprises a biological substance-immobilized gel which comprises a gel containing 2%-7% by mass of N,N-dimethylacrylamide and a biological substance immobilized on and/or in the gel, wherein the gel is arranged in multiple compartments; and detecting the target in the analyte based on uniform fluorescence in the gel, wherein the gel comprises a cross-linking agent in an amount of 0.1% to 1.5% by mass.

2. The method according to claim 1, wherein the target to be measured is a nucleic acid.

3. The method according to claim 2, wherein the nucleic acid is 100 nucleotides or less in length.

4. The method according to claim 1, wherein each compartment has a surface area of $10^{-6}$ $m^2$ or less.

5. The method according to claim 1, wherein the compartments are formed by slots or through holes.

6. The method according to claim 1, wherein the biological substance-immobilized gel microarray is obtained by tying a plurality of gel-filled hollow tubes in a bundle and cutting the tube bundle in a direction intersecting with the longitudinal direction of the tubes.

7. The method according to claim 6, wherein the hollow tubes are hollow fibers.

8. The method according to claim 1, wherein the cross-linking agent is a multifunctional monomer having at least two ethylenically unsaturated bonds.

9. The method according to claim 8, wherein the cross-linking agent is methylenebisacrylamide.

10. The method according to claim 1, wherein the gel comprises 2.7 to 4.5% by mass of N,N-dimethylacrylamide.

* * * * *

SEQUENCE LISTING

```
<160> NUMBER OF SEQ ID NOS: 6

<210> SEQ ID NO 1
<211> LENGTH: 27
<212> TYPE: DNA
<213> ORGANISM: Artificial Sequence
<220> FEATURE:
<223> OTHER INFORMATION: synthetic DNA

<400> SEQUENCE: 1

caaccaacca caactacata cacatac                                         27


<210> SEQ ID NO 2
<211> LENGTH: 25
<212> TYPE: DNA
<213> ORGANISM: Artificial Sequence
<220> FEATURE:
<223> OTHER INFORMATION: synthetic DNA

<400> SEQUENCE: 2

gtcatttaga caactctgca agcgt                                           25
```

-continued

```
<210> SEQ ID NO 3
<211> LENGTH: 651
<212> TYPE: DNA
<213> ORGANISM: Artificial Sequence
<220> FEATURE:
<223> OTHER INFORMATION: synthetic DNA

<400> SEQUENCE: 3

caaccaacca caactacata cacatacata cacaatggtc gctcaagttc aaaagcaagc      60

tccaactttt aagaaaactg ccgtcgtcga cggtgtcttt gacgaagtct ccttggacaa     120

atacaagggt aagtacgttg tcctagcctt tattccattg gccttcactt tcgtctgtcc     180

aaccgaaatc attgctttct cagaagctgc taagaaattc gaagaacaag gcgctcaagt     240

tcttttcgcc tccactgact ccgaatactc ccttttggca tggaccaata tcccaagaaa     300

ggaaggtggt ttgggcccaa tcaacattcc attgttggct gacaccaacc actctttgtc     360

cagagactat ggtgtcttga tcgaagaaga aggtgtcgcc ttgagaggtt tgttcatcat     420

cgacccaaag ggtgtcatta gacacatcac cattaacgat ttgccagtcg gtagaaacgt     480

tgacgaagcc ttgagattgg ttgaagcctt ccaatggacc gacaagaacg gtactgtctt     540

gccatgtaac tggactccag gtgctgctac catcaagcca accgttgaag actccaagga     600

atacttcgaa gctgccaaca aataagacgc ttgcagagtt gtctaaatga c              651


<210> SEQ ID NO 4
<211> LENGTH: 99
<212> TYPE: DNA
<213> ORGANISM: Artificial Sequence
<220> FEATURE:
<223> OTHER INFORMATION: synthetic DNA

<400> SEQUENCE: 4

gccaacaatg gaatgttgat tgggcccaaa ccaccttcct ttcttgggat attggtccat      60

gccaaaaggg agtattcgga gtcagtggag gcgaaaaga                             99


<210> SEQ ID NO 5
<211> LENGTH: 70
<212> TYPE: DNA
<213> ORGANISM: Artificial Sequence
<220> FEATURE:
<223> OTHER INFORMATION: synthetic DNA

<400> SEQUENCE: 5

aaatacgcct gcaggcggag atcttccagg cccgcctcaa gggctggttc gagccaatag      60

tggaagacat                                                             70


<210> SEQ ID NO 6
<211> LENGTH: 99
<212> TYPE: DNA
<213> ORGANISM: Artificial Sequence
<220> FEATURE:
<223> OTHER INFORMATION: synthetic DNA

<400> SEQUENCE: 6

gcccactggc gatgcatgtc ttccactatt ggctcgaacc agcccttgag gcgggcctgg      60

aagatctccg cctgcaggcg tatttgctgg gtctgttcc                             99
```